J. S. SURBAUGH.
SHOVEL.
APPLICATION FILED JULY 5, 1912.
1,085,642.
Patented Feb. 3, 1914.
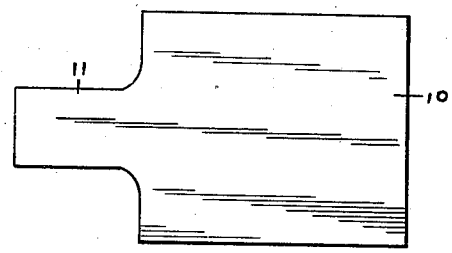
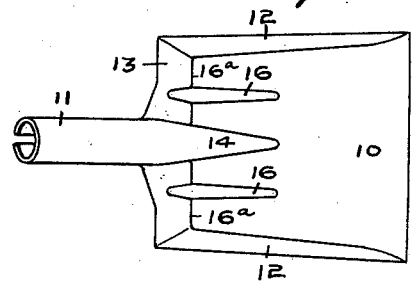
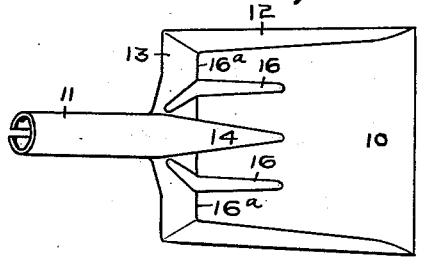
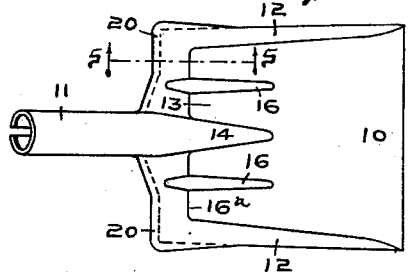
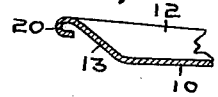
WITNESSES:
L. B. Woerner
J. H. Swan
INVENTOR
John S. Surbaugh
By Minturn & Woerner,
ATTORNEYS

UNITED STATES PATENT OFFICE.

JOHN S. SURBAUGH, OF VINCENNES, INDIANA, ASSIGNOR OF FORTY-NINE ONE-HUNDREDTHS TO HORACE P. RIDENOUR, OF VINCENNES, INDIANA.

SHOVEL.

1,085,642.  Specification of Letters Patent.  Patented Feb. 3, 1914.

Application filed July 5, 1912. Serial No. 707,924.

*To all whom it may concern:*

Be it known that I, JOHN S. SURBAUGH, a citizen of the United States, residing at Vincennes, in the county of Knox and State of Indiana, have invented certain new and useful Improvements in Shovels, of which the following is a specification.

This invention relates to grain and coal shovels of the hollow back type; and the object of the invention consists in the provision of shovels of the above character which will be simple in construction, light in weight, strong, durable and cheap to manufacture.

I accomplish the above objects of the invention by means of the structure shown in the accompanying drawings, forming a part hereof, in which—

Figure 1 is a top or plan view of a blank, comprising a unit structure as it is cut by the die from the metal sheet. Fig. 2 is a top or plan view of a finished shovel showing the ribs for reinforcing the shovel blade extending upwardly into the flanged portion of the shovel blade. Fig. 3 is a view similar to Fig. 2 except that the rear ends of the ribs for reinforcing the shovel are bent toward the handle to add greater strength to the shovel blades. Fig. 4 is a view similar to Fig. 2 except that the rear edge of the shovel blade is formed in a curl to add still greater strength and rigidity to the shovel blade. Fig. 5 is an enlarged detail sectional view on the line 5—5 in Fig. 4.

Referring to the drawings, 10 represents the blank which is cut from the body of the sheet metal by means of a suitable die in the usual manner, and terminates in the shank member 11. The blank 10 is placed into a crimping machine in which the shovel blade is formed, whereby the surrounding edges of the blank are raised to form the flanges 12, 12 and 13. The shank 11 is then bent into a cylinder to form a socket for securing the well known wooden handle. The flanges 12, 12 and 13 rising above the flat portion of the blade form a pocket for holding the material, this being common to all shovels. The flat portion of the shovel or blank is provided with a tapering frog 14, which is crimped upwardly, and which extends backwardly and merges with the shank 11, forming a socket for the handle, as shown in Fig. 2 of the drawings. The frog 14 adds rigidity to the shovel blade and is generally regarded sufficient in handling light material. For the handling of heavier material the shovel is provided with the ribs 16, as shown in Fig. 2, wherein the ribs extend backwardly from the meeting point 16ª of the rear flange 13 with the blade of the shovel. Fig. 3 shows that portion of the ribs 16, which extend across the face of the flange 13, being formed at an angle so that their rear extremities terminate in or near the central frog 14, thus insuring greater torsional support to the handle socket. It will be noted that the ribs above noted have their greatest width at the meeting point 16ª of the flange 13 and the blade portion of the shovel and that they taper gradually toward their extremities, as shown, which construction gives the greatest strength at the point of greatest strain, through the crystallization of the material along the line 16ª. The main object of this invention is to remedy this difficulty by increasing the strength and rigidity of the shovel blade, without increasing the weight, by providing the ribs heretofore described. The shovel blades may be further strengthened by curling the rear edge of the flange 13 into a roll or bead 20, which roll, if desired, may extend across the back and around the sides toward the cutting edges of the blades. The formation of the roll 20 is best shown in the enlarged sectional view illustrated in Fig. 5.

Having thus fully described my said invention, what I desire to secure by Letters Patent, is—

1. A shovel blade comprising a unit blank provided with an integral shank, said blank being crimped to provide a flat portion with raised sides and back, a cylinder formed of said shank, a centrally formed reinforcing frog in said blade extending to and merging with said cylinder, a reinforcing rib formed on each side of said frog across the juncture of the back and flat portion of the shovel blade and having their greatest width at said juncture, the rearward ends of said ribs back of said juncture being turned inwardly toward the central frog.

2. A shovel blade comprising a unit blank provided with an integral shank, said blank being crimped to provide a flat portion with raised sides and back, a cylinder formed of said shank, a centrally formed reinforcing frog in said blade extending to and merging with said cylinder, a reinforcing rib formed on each side of said frog across the juncture of the back and flat portion of the shovel blade and having their greatest width at said juncture.

3. A shovel blade comprising a unit blank provided with an integral shank, said blank being crimped to provide a flat portion with raised sides and back, a cylinder formed of said shank, a centrally formed reinforcing frog in said blade extending to and merging with said cylinder, a reinforcing rib formed in said blade on each side of said frog the rear end of which terminates near a curl on the rear end of the shovel, said curl extending to and merging with the base of the cylinder.

In witnesses whereof, I, have hereunto set my hand and seal at Vincennes, Indiana, this 15th day of June, A. D. one thousand nine hundred and twelve.

JOHN S. SURBAUGH. [L. S.]

Witnesses:
 THOS. B. COULTER,
 D. M. BURKE.

---

Copies of this patent may be obtained for five cents each, by addressing the "Commissioner of Patents, Washington, D. C."